US012704850B2

(12) United States Patent
Di Cecilia et al.

(10) Patent No.: US 12,704,850 B2
(45) Date of Patent: Aug. 11, 2026

(54) METHOD FOR MANAGING AN AGRICULTURAL VEHICLE DURING HARVESTING PROCESS IN A PLANTATION OF FRUIT TREES, SUCH AS AN ORANGE ORCHARD

(71) Applicant: CNH INDUSTRIAL ITALIA S.P.A., Turin (IT)

(72) Inventors: Luca Di Cecilia, Turin (IT); Mauricio Blanco Infantini, Nova Lima (IT)

(73) Assignee: CNH Industrial Italia S.p.A., Turin (IT)

( * ) Notice: Subject to any disclaimer, the term of this patent is extended or adjusted under 35 U.S.C. 154(b) by 0 days.

(21) Appl. No.: 18/834,561

(22) PCT Filed: Jan. 27, 2023

(86) PCT No.: PCT/EP2023/052066
§ 371 (c)(1),
(2) Date: Jul. 30, 2024

(87) PCT Pub. No.: WO2023/144336
PCT Pub. Date: Aug. 3, 2023

(65) Prior Publication Data

US 2025/0155893 A1 May 15, 2025

(30) Foreign Application Priority Data

Jan. 31, 2022 (IT) ........................ 102022000001616

(51) Int. Cl.
*A01D 46/24* (2006.01)
*A01B 69/04* (2006.01)
(Continued)

(52) U.S. Cl.
CPC ......... *G05D 1/2435* (2024.01); *A01B 69/008* (2013.01); *A01D 46/24* (2013.01);
(Continued)

(58) Field of Classification Search
CPC ............... G05D 1/2435; G05D 1/0251; G05D 2105/15; G05D 2107/21; G05D 1/2465;
(Continued)

(56) References Cited

U.S. PATENT DOCUMENTS 7,748,206 B1 * 7/2010 Posselius ............ A01D 75/185 56/328.1
8,336,283 B2 * 12/2012 Berthet ................. A01D 46/28 56/340.1
(Continued)

FOREIGN PATENT DOCUMENTS

BR 102020022751 A2 * 5/2022 ........... A01D 46/264
FI 20186029 A1 * 5/2020 ........... G06V 20/188
GB 2507560 A * 5/2014 ............. G01S 17/87

OTHER PUBLICATIONS

WO-2020248033-A1 with English translation (Year: 2020).*
(Continued)

*Primary Examiner* — Calvin Cheung
(74) *Attorney, Agent, or Firm* — Fletcher Yoder, P.C.

(57) ABSTRACT

A method for managing an agricultural vehicle during harvesting process in a plantation of fruit trees, the vehicle being shaped as a portal capable of moving over a crop row and provided with a couple of rotors arranged to work simultaneously on opposite sides of each plant of the crop row, the method including a process of recognition of trunks of the trees by a first 3D sensor system interfaced with processing means of a vehicle, wherein the first 3D sensor system includes a couple of 3D sensors arranged in a low portion of the agricultural vehicle at opposite sides of the vehicle oriented such that to converge in common point in front of the vehicle, the process including fitting of pseudo-ellipsoids in a horizontal slice of a merged point cloud generated by the two 3D sensors, in order to identify trunks of the crop row.

10 Claims, 7 Drawing Sheets

(51) Int. Cl.
*G05D 1/243* (2024.01)
*G05D 1/246* (2024.01)
*G05D 105/15* (2024.01)
*G05D 107/20* (2024.01)

(52) U.S. Cl.
CPC ....... *G05D 1/2465* (2024.01); *G05D 2105/15* (2024.01); *G05D 2107/21* (2024.01)

(58) Field of Classification Search
CPC .. G05D 1/0212; G05D 1/0274; A01B 69/008; A01D 46/24; B62D 49/0607; G01S 17/88
See application file for complete search history.

(56) References Cited

U.S. PATENT DOCUMENTS 8,488,877 B1 * 7/2013 Owechko ............... G06V 20/64 382/165
9,165,383 B1 * 10/2015 Mendez-Rodriguez ..................... G06T 11/001
2014/0109541 A1 * 4/2014 Berthet .................. A01D 46/28 56/340.1
2017/0064278 A1 * 3/2017 Posselius ............. G05D 1/0251
2021/0278848 A1 9/2021 An et al.
2021/0337734 A1 11/2021 Jeanty et al.

OTHER PUBLICATIONS

Izard, “Development and Field Testing of LiDAR Applications in Agricultural Mobile Vehicles: Safety, In-Row Tree Evaluation and Crop Assessment,” retrieved on Dec. 31, 2015, 247 pgs.
Application No. IT 202200001616 Search Report, dated Aug. 2, 2022, 1 pgs.
Application No. PCT/EP2023/052066, International Search Report and Written Opinion, dated Mar. 29, 2023, 12 pgs.
Izard “Development and Field Testing of LiDAR Applications in Agricultural Mobile Vehicles: Safety, In-Row Tree Evaluation and Crop Assessment,” 2015, 247 pgs.

* cited by examiner

METHOD FOR MANAGING AN AGRICULTURAL VEHICLE DURING HARVESTING PROCESS IN A PLANTATION OF FRUIT TREES, SUCH AS AN ORANGE ORCHARD

CROSS-REFERENCE TO RELATED APPLICATION

This application is a national stage of PCT Application No. PCT/EP2023/052066, entitled "METHOD FOR MANAGING AN AGRICULTURAL VEHICLE DURING HAR VESTING PROCESS IN A PLANTATION OF FRUIT TREES, SUCH AS AN ORANGE ORCHARD", filed Jan. 27, 2023, which claims priority from and benefit of IT application Ser. No. 10/202,2000001616, filed Jan. 31, 2022, which are hereby incorporated by reference in their entirety.

FIELD OF THE INVENTION

The present invention relates to autonomous control of harvesting machines in the agricultural field.

DESCRIPTION OF THE PRIOR ART

Mechanical harvesting of oranges and similar row crops plantations (e.g. coffee, grape, almonds, olives) is not a simple task, since the orange harvester can damage the trees by breaking their branches.

The present applicant has developed four wheeled vehicle shaped as a building portal capable to move passing over crop rows. In particular, in operation, two wheels W are arranged on one side of the crop row and further two wheels are arranged one the opposite side of the same crop row, with a sort of bridge connecting all the wheels, such that the vehicle defines a central tunnel capable to pass over the crop row.

Hydraulic motors are arranged to drive each wheel such that no driveshaft is implemented, which could physically interfere with the trunks of the crop row.

Two substantially vertical rotors R are arranged in such a way to harvest the crop row on both its opposite sides, while the vehicle moves over the crop row itself.

The rotors are capable of rotating/vibrating at different RPMs in order to detach the fruits, for example oranges, from the branches of the trees alignment.

Usually, the driver cabin is arranged on one side of the vehicle such that to remain sufficiently low to be easily reached by the driver. Due to the mismatch between the position of the driver cabin and the centerline of the vehicle, the driver has not an optimal viewpoint to perfectly match the centerline of the vehicle over the trees alignment.

One of the most common damages caused on trees is the trunk and thick branches breaking, due to the two rotors movement. This can lead the trees to develop diseases, which can also bring the plant to death.

Often the trunks are broken due to the vehicle misalignment, due to the too short distance between one of the machine rotors and one side of the trees row.

FIG. 1*a* discloses a common situation, where the vehicle centerline VC has a lateral misalignment OTE (off-track error) from the trees alignment centerline TAC.

In other words, the vehicle centerline VC and the trees alignment centerline TAC are reciprocally parallel but with a lateral shift.

FIG. 1*b* discloses a different situation where the vehicle has an angular misalignment (cross track error XTE), which means that the vehicle centerline VC and the trees alignment centerline TAC are not parallel and define an incidence angle β.

Nowadays, there is an increasing need for agricultural machines capable of performing autonomous operations, due to a lack of specialized people capable of handling such agricultural vehicles.

SUMMARY OF THE INVENTION

Therefore, it is the main object of the present invention to provide a solution for solving at least the lateral misalignment OTE.

According to the present invention, two 3D sensors are used for imaging the field in front of the vehicle, in order to recognize the trunks of the plant.

Each 3D sensor could be a LiDAR, a stereo camera (VIS, NIR, SWIR, LWIR), a RADAR, an ultrasonic sensors array, or any 3D sensor or sensor set in general, capable to produce a 3D point cloud. Preferably, a 3D multi-layer point cloud sensor 3DS is implemented.

Each point of the point cloud represents a spot where the light—laser in the case of LiDAR—is back reflected by a part of an object in the scene, e.g. a leaf, a rock, a branch. The better the resolution of the sensor, and the higher is the number of layers that the 3DS is capable of collecting. This leads to a denser and richer point cloud that is available for post-processing.

According to the invention, the 3D sensors are arranged in a low portion, preferably at about 30 centimeters from the from the ground, of the vehicle in order to "see" the trunks of the plant arranged ahead of the vehicle from the two opposite lateral sides of the vehicle. The point cloud is sliced according to a horizontal plane, parallel to the ground.

The pointclouds are then merged together to obtain a cumulative point cloud indicating the position of the plantation trunks. This merged point cloud hereinafter is named as "horizontal point cloud".

According to a first embodiment of the invention, the trunks positions are used to control the steering angle of the vehicle.

According to second embodiment of the invention, the trunk positions are used to shift laterally a shaking portion of the vehicle such that the shaking portion is centered with the harvested tree with a certain freedom with respect to the trajectory followed by the vehicle as a whole.

Preferably, the shaking portion includes the above rotors connected to the vehicle frame through a sliding support capable to move each rotor independently from another according to a transversal direction with respect to the longitudinal development of the vehicle or capable to move both rotors together by keeping a fixed distance between themselves.

In this second case, the vehicle can be driven by a human being or can be driven by a separate autonomous driving system.

According to a preferred embodiment of the invention including a separate autonomous driving system, the latter includes a further 3D sensor arranged on the vehicle roof, preferably at the front and with the imaging axis overlapped with the vehicle centerline, namely the longitudinal axis arranged in the middle of the right and left wheels. The transversal section of an orange tree can be approximated with a pseudo-ellipsoid. In fact, the tree height and its width are more or less comparable, and this assumption can be exploited for estimating the peak position, corresponding to the trunk position. A second pointcloud is obtained through the further 3D sensor and a slice transversal to the vehicle centerline extracted.

Therefore, the first 3D sensor system produces a "horizontal slice", while this further 3D sensor system produces a "transversal slice". Then, a windowing is applied to the transversal slice such that to cut the lateral portions. Then the best curve fit is searched.

According to the present description "pseudo-ellipsoid" an ellipsoid, a circumference, a catenary, a Gaussian, a Polynomial is meant. It should be considered that the two-dimensional maps defined by the transversal slices can be stretched or manipulated, such that the tree canopy pass from the ellipsoidal shape to an almost circular shape and vice versa.

When the fitting is considered as acceptable, through a fitting quality index, the fit-curve is acquired and its maximum point, according to the ordinate axis, is acknowledged as the center of the crop line, which indicate the trees peaks and gives a good indication of the corresponding trunks position.

Then the lateral mismatch is computed as the difference between the centerline of the vehicle and the center of the detected crop row, which corresponds to maximum point of the fitting curve, in a metric form.

Preferably, the process is iterated for a certain number of transversal slices, at least two, and the lateral mismatch values are computed for each slice. Then the mismatch values for each transversal slice, with respect to the longitudinal vehicle axis, are used to perform fast correction of the vehicle displacement.

Therefore, while the horizontal slices are used to control a lateral shift of the shaking system, the transversal slice are used to control the vehicle steering angle.

According to the preferred embodiment of the invention, also the cross track error $\beta$ (XTE) is identified. Such track error is identified by using two transversal slices at known different distances and calculating the arctan ($\varepsilon$/dist) where $\varepsilon$ is algebraic difference of the lateral misalignment OTE and dist is the distance between the slices.

With "worked crop row" is meant the crop row subject to the vehicle harvesting.

According to a preferred embodiment of the invention, the steering is controlled in such a way that the current vehicle direction is overlapped with that of the crop row.

Preferably, the Agricultural Vehicle is also equipped with a GPS antenna, that provides global coordinates, enables mapping capability, and also permits to trace a vehicle direction movement. This aspect could represent a sort of fallback solution when one or more trees are missing or simply not detected by the 3D sensor. Often the tree rows are planted by recurring to GPS positioning, therefore, the tree alignments are approximately straight. This means that when the second 3D sensor system fails, the tracking of the vehicle position can be exploited to maintain the moving direction at least till the second 3D sensor system restarts to recognize the trees canopy.

These and further objects are achieved by means of the attached claims, which describe preferred embodiments of the invention, forming an integral part of the present description.

BRIEF DESCRIPTION OF THE DRAWINGS

The invention will become fully clear from the following detailed description, given by way of a mere exemplifying and non limiting example, to be read with reference to the attached drawing figures, wherein.

Figure 1A:
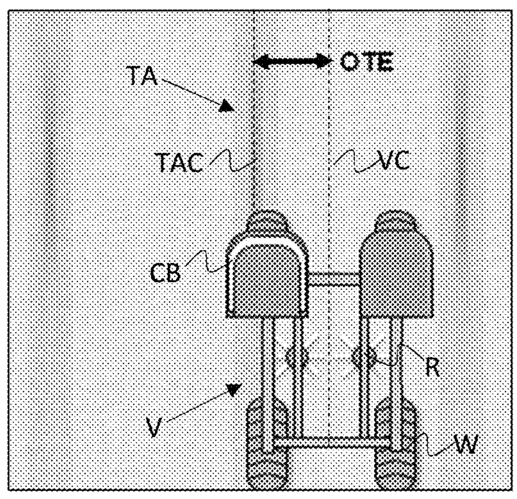
FIGS. 1*a* and 1*b* show two possible situations about misalignment between the agricultural vehicle and a crop row of fruit trees.

Dashed blocks are optional.

According to the present description crop row is used to indicate not only an alignment of fruit trees but also its centerline, especially when a mismatch with a vehicle centerline is considered.

The same reference numerals and letters in the figures designate the same or functionally equivalent parts or functions.

According to the present invention, the term "second element" does not imply the presence of a "first element", first, second, etc., are used only for improving the clarity of the description and they should not be interpreted in a limiting way.

DETAILED DESCRIPTION OF THE PREFERRED EMBODIMENTS

The present invention proposes a self-alignment algorithm of an agricultural vehicle or of a portion of it in particular of the kind adapted to pass over a row of trees. Therefore, the vehicle is conformed as described above, with two rotors R arranged to shake the branches on both sides of the same trees row, while the vehicle moves along the crop row.

According to the present invention, a couple of 3D sensors are arranged in a low portion of the agricultural vehicle.

Figure 2:
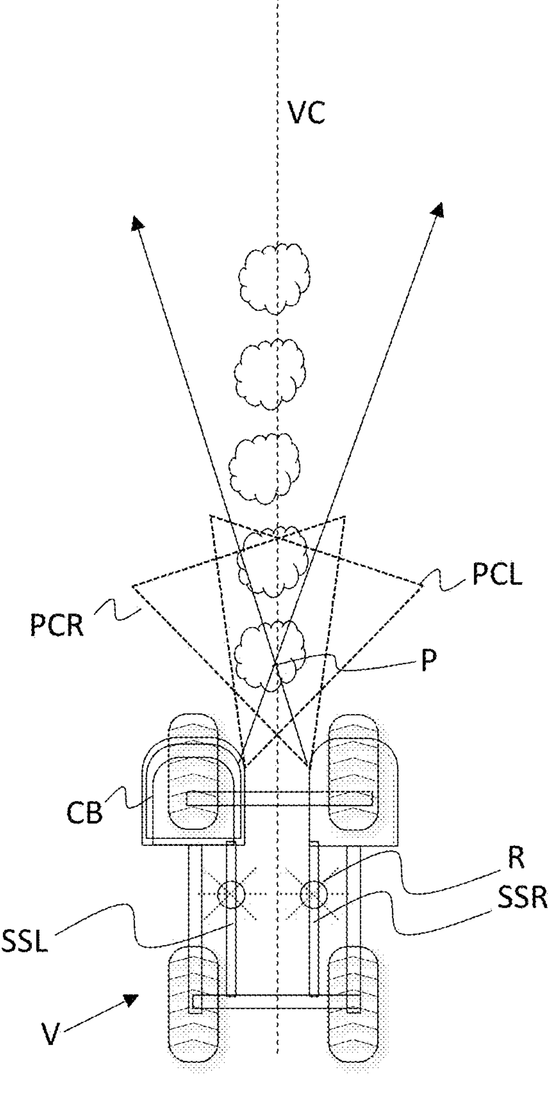
FIG. 2 discloses an agricultural vehicle modified according to the present invention.

Preferably, according to FIG. 2, each of the 3D sensors is attached to the lower end of the rotors R disclosed above.

Figure 1B:
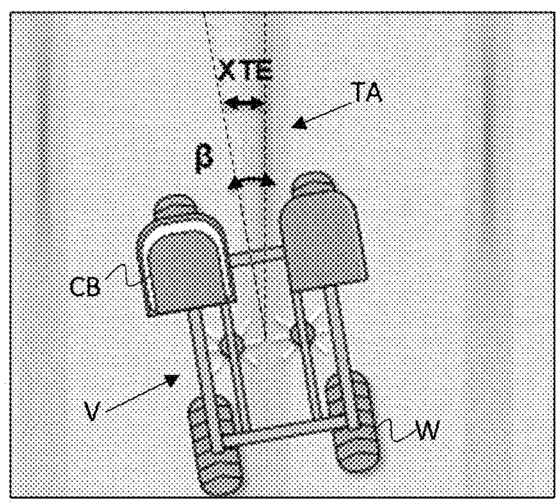

Each of the 3D sensors defines a view cone circa triangular and both sensors are arranged such that they are convergent in a common point P arranged circa on the axis VC defined by the longitudinal development of the vehicle as disclosed in FIGS. 1*a* and 1*b*.

Each of the 3D sensors acquires a point cloud. The point clouds of the 3D sensors acquired at a simultaneous time instant are merged to obtain one overall point cloud and a horizontal slice is extracted.

Here the expression horizontal is clear being circa parallel with the ground.

It should be clear that this horizontal slice can be obtained even if the 3D sensors are arranged such that their view line is not horizontally arranged.

Once the horizontal slice is obtained, pseudo-ellipsoid figures are fitted in order to identify the canopy trunks.

Preferably, the lateral portions of the horizontal slice are preliminarily cancelled or neglected in order to focus the fitting operation in a central window of the horizontal slice.

The pseudo-ellipsoid close to the lower portion of the horizontal slice represents the trunk of the plant close to the vehicle.

According to the invention the method includes the following steps in succession:

(Step a) simultaneous acquisition of two point clouds obtained from two 3D sensors arranged in a lower portion of the vehicle and converging in common point P pf the center line axis of the vehicle, in front of the vehicle, (Step b) merging of the two point clouds obtained and (Step c) extraction of a horizontal slice circa parallel with the ground, (Step d) fitting of preuso-ellipsoids in order to identify trunks of the worked plants.

It should be clear that the merging of the two point clouds can be executed before or after the extraction of the horizontal slice. Two horizontal slices can be extracted and then merged.

Example 1

This information can be exploited according to a first embodiment of the invention to allow the vehicle to trace autonomously its route along the plantation row. For example, the system can find the centroid of each of the above found pseudo-ellipsoid curves and then the route is defined by the interconnection or interpolation of said centroids.

Example 2

According to a second embodiment of the invention, the rotors R of the vehicle are slidingly connected to the vehicle frame such that they can slide according to a direction transversal with respect to the vehicle center line VC (or longitudinal development) and the information relating to the position of the pseudo-ellipsoid is exploited to adjust the position of each rotor in respect of the position of the trunk closest to the vehicle such that each rotor is at the same distance from said centroid. In other words the rotors are moved such that the trunk is in the intermediate position between the rotors. Here, with "intermediate" position, a position having circa equal distance from both the rotors is meant.

Example 2.1

According to this second case the vehicle steering angle can be managed by a human being.

Example 2.2

Alternatively, an autonomous drive, independent from said first 3D sensor system, which traces the route that the vehicle has to follow and controls its steering angle accordingly.

Example 2.2.1

The autonomous drive, for example, can exploit a previously obtained GPS mapping of the plantation rows to plan the route.

Example 2.2.2

According to a further preferred embodiment of the invention, the above two 3D sensors define the "first 3D sensor system" and it is exploited only to control the transversal sliding of the rotors R such that they are equally spaced from the centroid of the trunk of the worked plant.

The vehicle is provided of a second 3D sensor system that can include a LiDAR, a stereo camera (VIS, NIR, SWIR, LWIR), a RADAR, an ultrasonic sensors array, or any 3D sensor or sensor set in general, capable to produce a second 3D point cloud. Preferably, a 3D multi-layer point cloud sensor is implemented.

The second 3D sensor system is arranged on the top and at front of the vehicle in order to scan the environment in front of the vehicle.

Preferably, but not necessarily, the second 3D sensor is arranged in the centreline of the vehicle to obtain a point cloud of the environment in front of the vehicle aligned with the vehicle center line VC.

Figure 5:
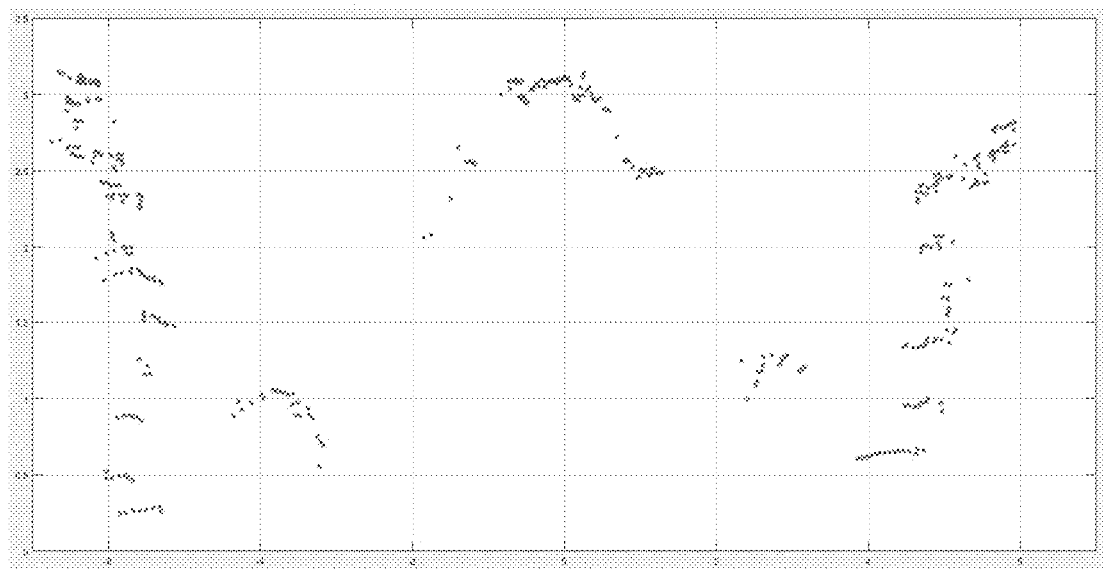
FIG. 5 discloses a transversal slice of the point clouds scanned by means of a second 3D sensor arranged on the vehicle roof.

The point cloud of FIG. 5 is the output of a single layer scan of a LiDAR, which is usually multi-layered, projected on its transverse plane with respect to the vehicle center line. In the following such layer represents the slice obtained at a predetermined distance in front of the vehicle. It should be understood that the terms "layer" and "slice" are used in an interchangeable way.

Figure 3:
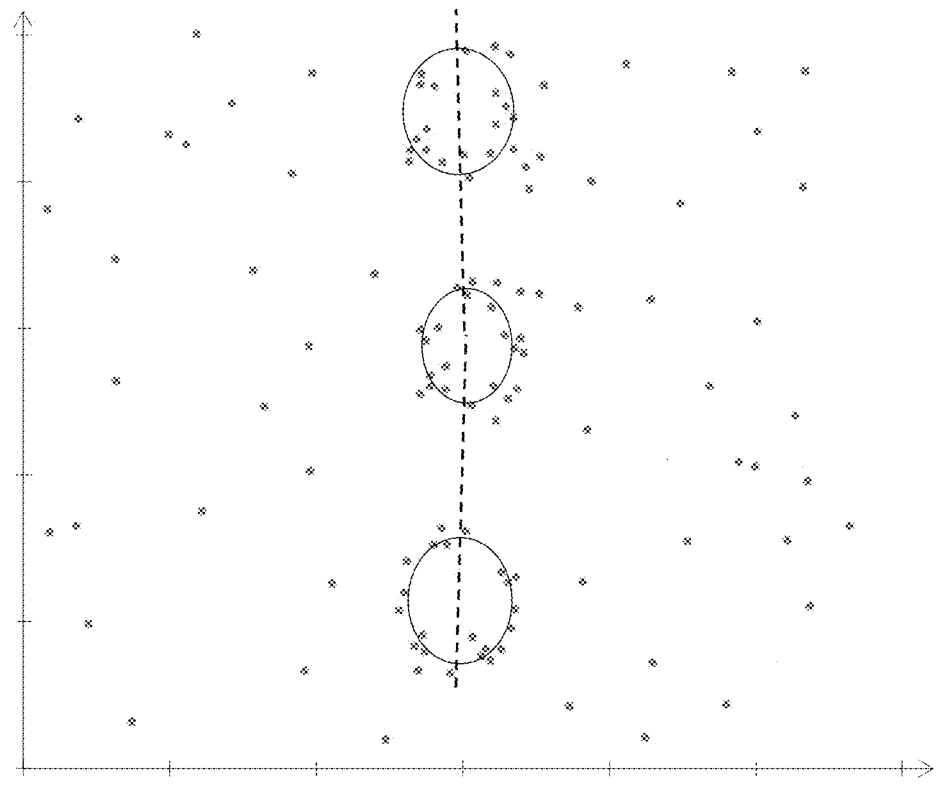
FIG. 3 discloses a horizontal slice of the merging of two point clouds obtained by as much 3D sensor arranged in a lower portion of the vehicle.
Figure 4:
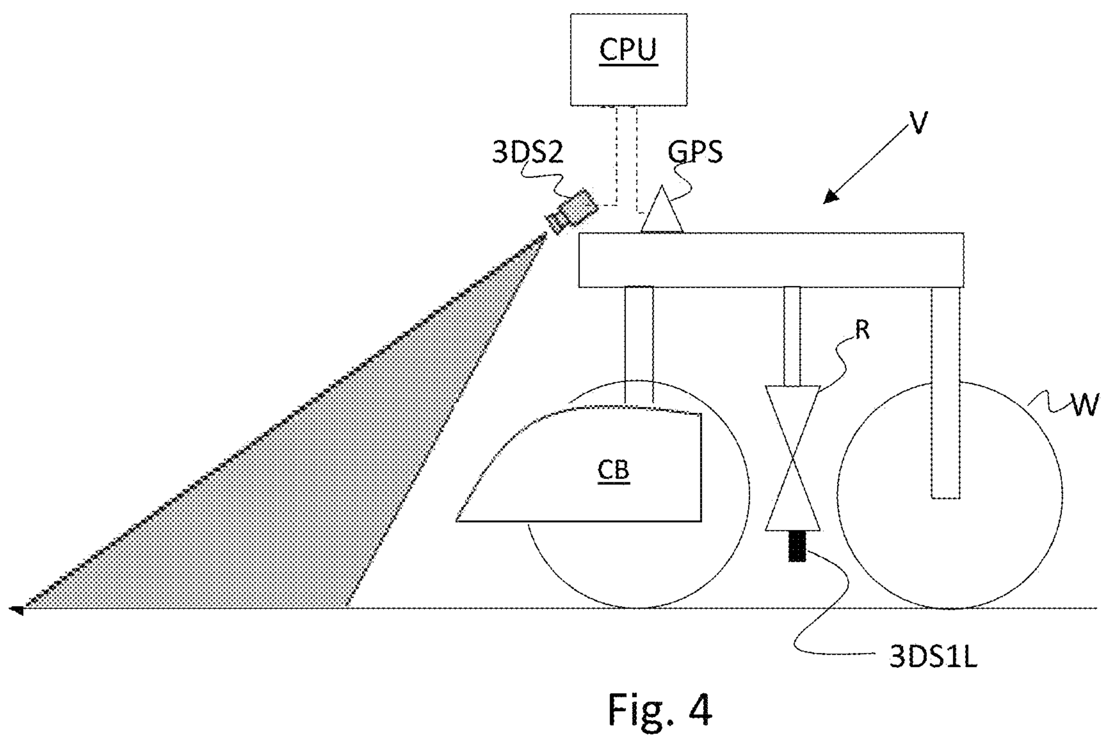
FIG. 4 discloses a side view of an agricultural vehicle modified according to the present invention.

In order to easily distinguish the slice of FIG. 5 from the horizontal slice of FIG. 3, the slice of FIG. 5 is named as "transversal slice".

According to this embodiment, the identification of the correct vehicle trajectory, is carried out by identifying the crop row centerline TAC of a plantation to be worked by means of the second 3D sensor.

It is clear that the first and the second 3D sensor system are interfaced with processing means CPU of the agricultural vehicle, where the processing means are programmed to calculate the vehicle trajectory and to control the vehicle steering angle accordingly and to detect the exact position of the closes trunk to better fit the rotors position.

The trajectory through the second 3D sensor system is identified according to the method comprising the following steps in the same order:

(Step 1) acquisition of a 3D point cloud from said 3D sensor corresponding to reflections picked up by said 3D sensor (3DS) from a scenario in front of the vehicle V, (Step 2) processing of said 3D point cloud to obtain a two-dimensional map as a slice of the point cloud according to a cutting plane of the 3D point cloud, transversal to a vehicle centerline at a first predetermined distance H1 from the vehicle front portion, (Step 4) first fitting to obtain a first pseudo-ellipsoid interpolating curve C1 on the two-dimensional map, (Step 5) identification of a peak PK1 associated to said pseudo-ellipsoid interpolating curve and calculating a misalignment OTE between such peak PK1 and a vertical line of the two-dimensional map corresponding to the vehicle centerline VC, (Step 6) controlling a vehicle trajectory such as to minimize said distance.

When the 3D sensor is perfectly placed on the vehicle center line, the vehicle center line corresponds to the vertical center line drawn in the two-dimensional map, otherwise a fixed offset is expected.

It is clear that the second 3D sensor system can be arranged on one side of the vehicle, in any case parallel arranged to the longitudinal development of the vehicle. For example, if the second 3D sensor is shifted to the right of the vehicle, the vertical line in the two-dimensional map corresponding to the transversal slice corresponding to the vehicle's centerline is proportionally shifted to the left. These are simple concepts and within the reach of the person skilled in the art.

It is clear that only one vertical line in the transversal slice corresponds to the vehicle center line to which the 3D sensor is associated.

Figure 6:
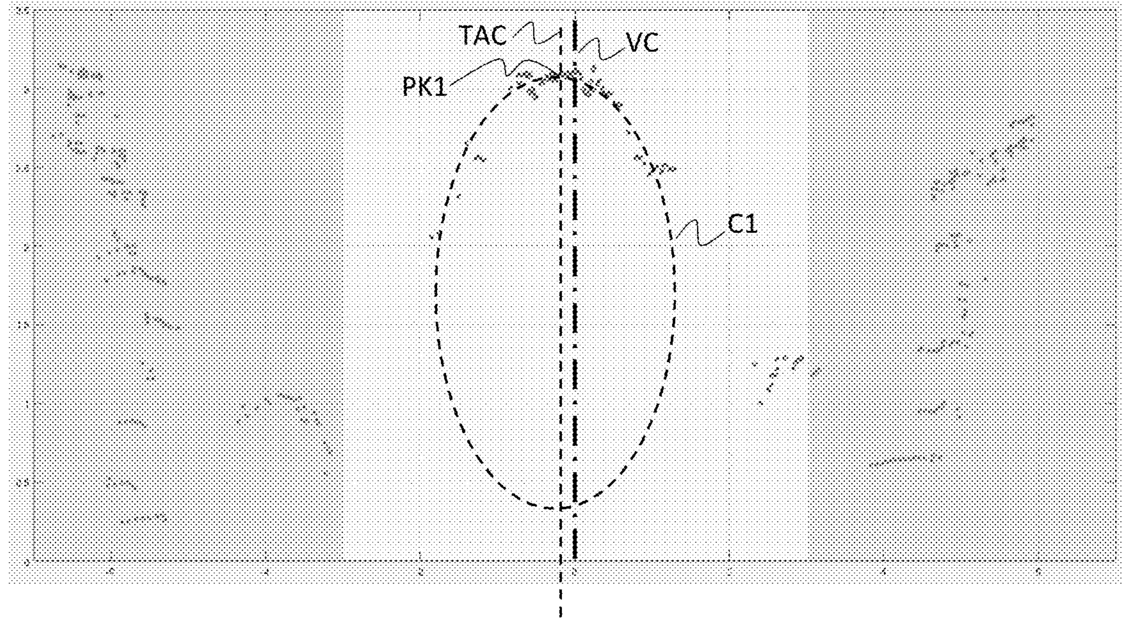
FIG. 6 shows two steps of an iteration of a preferred embodiment of the present invention in order to calculate a misalignment of the vehicle center line with respect to a crop row through the second 3D sensor.

In order to simplify the understanding of the procedure, in FIG. 6 the centerline of the tree alignment TAC is traced passing for the corresponding peak PK1. The peak PK1 is the higher point of the pseudo-ellipsoid in the transversal slice, which defines a 2D map.

Preferably, a central windowing (Step 3) of the transversal slice is carried out immediately before the first fitting step Step 4, such that to cut lateral portions of the 2D map.

It is assumed that the driver of the vehicle contributes with a preliminary alignment of the vehicle with the crop row to be worked and then the autonomous driving system is able to identify the appropriate trajectory to be followed in the field according to the present embodiment.

According to a further embodiment of the invention, the pseudo-ellipsoid obtained from the transversal slice is also used to control the distance between the rotors.

In other words:

The first 3D sensor system aims to center the clearance between the rotors on the trunk of the plant to be worked, such that both the rotors are at the same distance from the trunk, The second 3D sensor system aims to control the vehicle steering angle.

It should be clear that all the embodiments can be implemented in the same autonomous drive system and autonomously selected according to the available data.

The second 3D imaging system is pre-calibrated in order to determine the (Field Of View) FOV and the actual measured distance on the ground, facing down at an angle, e.g. 25° tilting.

Preferably, each of the fitting procedures discussed above are considered as acceptable when a fitting index (goodness of fit, G.O.F.) exceeds a predetermined threshold, e.g. 0.8. According to the present description the peaks PK1, PK2 . . . are the maximum of the respective fitting curve in the ordinate axis of the transversal slice as clearly disclosed in FIG. 6.

As disclosed in the summary of the invention, a GPS positioning system can be exploited alternatively or in combination with the second 3D sensor system in order to decide the path to be followed.

Figure 7:
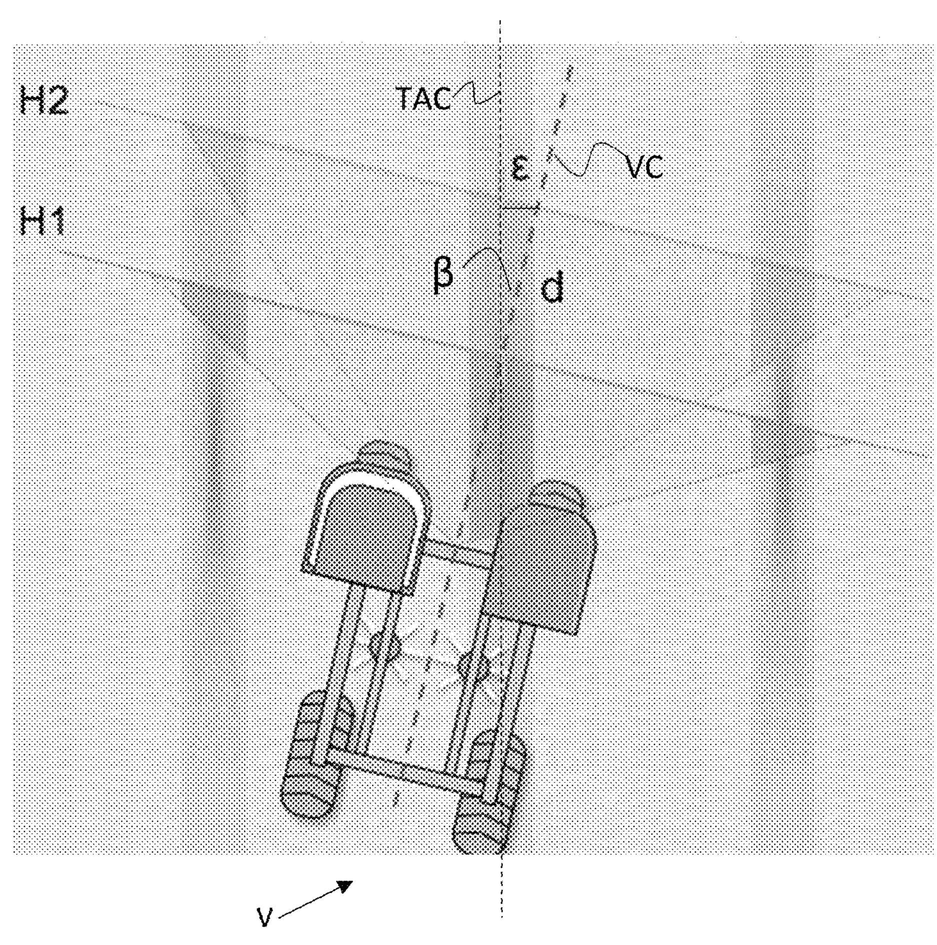
FIG. 7 discloses another implementation of the present invention considering two (or more) transversal slices H1, H2.
Figure 8:
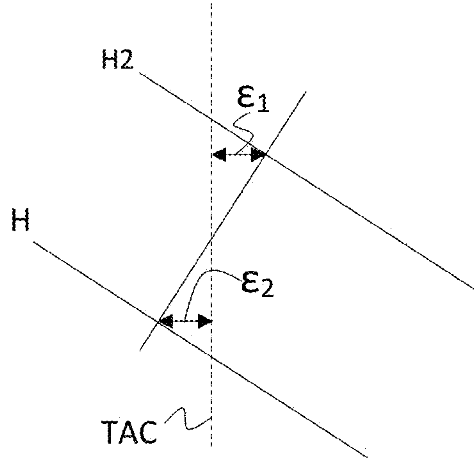
FIG. 8 discloses a more general case to construe a geometrical formula to calculate an angular misalignment XTE, FIGS. 9*a* and 9*b* disclose examples of flow diagrams of a preferred embodiment of the present method.
Figure 9A:
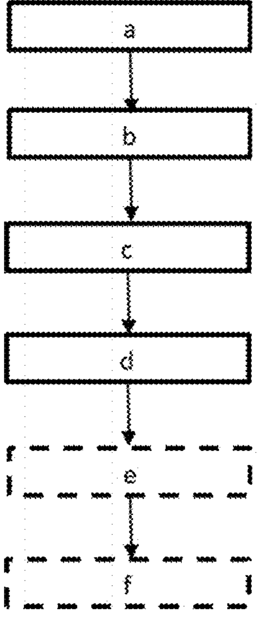
Figure 9B:
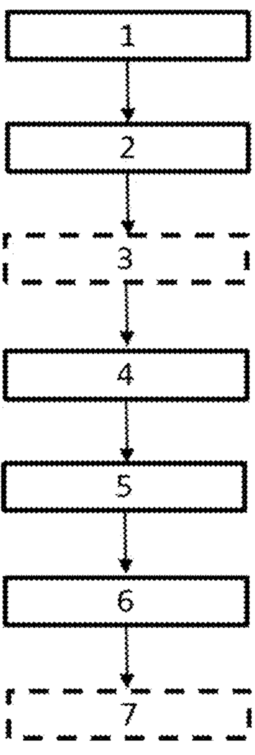

According FIGS. 7 and 8 it is clear that the present invention is implemented for two transversal layers H1 and H2 acquired at two different distances from the front portion of the vehicle. While in FIG. 7, the first mismatch error (on H1) is zero and second mismatch error (on H2) is $\varepsilon$, in FIG. 8 there are two errors $\varepsilon_1$, $\varepsilon_2$.

The mismatch angle $\beta$ can be calculated as arctan ($\varepsilon$/dist) where $\varepsilon$ is algebraic difference of the lateral misalignments OTE and dist is the distance between the slices H1 and H2. For example, in FIG. 7 the first mismatch is zero and the second is $\varepsilon$, therefore the calculation is immediate.

According to FIG. 8, the situation should be forced to that of FIG. 8, thus $\varepsilon=(\varepsilon_1-(-\varepsilon_2))=\varepsilon_1+\varepsilon_2$.

When instead both the errors are positive, because there is a strong right lateral mismatch $\varepsilon=(\varepsilon_1-(+\varepsilon_2))=\varepsilon_1-\varepsilon_2$. Two (or more) 3D sensors can be arranged to obtain multiple point clouds in order to calculate the mismatch values between vehicle centreline and crop row centreline at two subsequent horizontal positions H1, H2 as disclosed in FIG. 7.

It should be clear that, when the vehicle is pre-aligned with a worked row, the angular mismatch XTE is corrected automatically by the recursive correction of the lateral mismatch OTE.

The vehicle moving direction can be adjusted both by subsequent image/point-cloud processing outputs (Steps 1-6), and monitoring the heading angle estimated on the basis of vehicle positions acquired by the GPS, such that to provide a feedback of the actual steering that the machine made (assuming that the GPS antenna is positioned properly, i.e. on the longitudinal vehicle axis Preferably, the GPS axis matches the longitudinal agricultural vehicle axis.

The GPS antenna provides both coordinates (Latitude, Longitude) as well as azimuth angle, which is the angle with respect to the magnetic north, and ground speed, inertial parameters (yaw, pitch, roll).

Preferably, the 3D Sensor have a wide Field Of View (FOV) in order to include at least the central and two lateral rows within the picture.

The present invention can be advantageously realized by means of a computer program which comprises coding means for carrying out one or more steps of the method, when this program is executed on a computer. Therefore it is intended that the scope of protection extends to said computer program and further to computer readable means comprising a recorded message, said computer readable means comprising program coding means for carrying out one or more steps of the method, when said program is run on a computer.

Implementation variants of the described non-limiting example are possible, without however departing from the scope of protection of the present invention, including all the equivalent embodiments for a person skilled in the art, to the content of the claims.

From the above description, the person skilled in the art is able to realize the object of the invention without introducing further construction details.

The invention claimed is:

1. A method for managing an agricultural vehicle during a harvesting process in a plantation of fruit trees, comprising:

a process of recognizing trunks of the fruit trees of the plantation to be worked by means of a first three-dimensional (3D) sensor system interfaced with a processor of the agricultural vehicle, wherein the agricultural vehicle is shaped to have a portal configured to move over a crop row as the agricultural vehicle moves over the crop row and the agricultural vehicle comprises a couple of rotors arranged to work simultaneously on opposite sides of each plant of the crop row, and wherein the first 3D sensor system comprises a couple of 3D sensors arranged in a lower portion of the agricultural vehicle on opposite sides of the agricultural vehicle and oriented to converge on a common point approximately on a vehicle center line axis in front of the agricultural vehicle, the process comprising the following steps of:

simultaneously acquiring two point clouds obtained from the couple of 3D sensors;

merging of the two point clouds to obtain a cumulative point cloud;

processing of the cumulative point cloud to obtain a first two-dimensional map as a horizontal slice approximately parallel with a ground; and performing a first fitting of pseudo-ellipsoids in the first two-dimensional map in order to identify the trunks of plants being worked in the crop row.

2. The method according to claim 1, wherein the method further comprises:

tracing a route based on a position of the first fitted pseudo-ellipsoids by performing a linear regression operation; and controlling steering of the agricultural vehicle according to the route traced.

3. The method according to claim 1, wherein the couple of rotors are substantially vertical arranged in such a way to harvest the crop row on the opposite sides of each plant of the crop row while the agricultural vehicle moves over the crop row itself, wherein the rotors are in a direction transverse to the vehicle center line axis, and wherein the method further comprises laterally adjusting a position of the couple of rotors according to a position of a detected trunk closest to the front of the agricultural vehicle so that the detected trunk is in an intermediate position between the couple of rotors.

4. The method according to claim 3, further comprising an additional process for identifying a trajectory that overlaps a crop row centerline of the plantation to be worked via a second 3D sensor system arranged in a top position of the agricultural vehicle and interfaced with the processor, the additional process comprising the following steps of:

acquiring a 3D point cloud from the second 3D sensor system corresponding to reflections picked up by the 3D sensor system in the front of the agricultural vehicle;

processing of the 3D point cloud to obtain a second two-dimensional map as a transversal slice of the 3D point cloud according to a transversal cutting plane of the 3D point cloud that is transverse to the vehicle centerline at a first predetermined distance from the front of the agricultural vehicle;

performing a second fitting to obtain a pseudo-ellipsoid interpolating curve on the second two-dimensional map;

identification of a peak (PK1) associated to the pseudo-ellipsoid interpolating curve and calculating a lateral misalignment (OTE) between such peak (PK1) and a vertical line of the second two-dimensional map corresponding to the vehicle centerline (VC); and controlling a trajectory of the agricultural vehicle in order to minimize the first predetermined distance.

5. The method according to claim 4, further comprising performing a first windowing of the second two dimensional map immediately before performing the second fitting in order to cut lateral portions of the second two dimensional map.

6. The method according to claim 1, wherein execution of the steps for the process is recursive according to a vehicle forward motion of the agricultural vehicle.

7. The method according to claim 1, further comprising:

preliminarily acquiring a GPS crop row position; and controlling a steering angle of the agricultural vehicle in order to maintain a motion of the agricultural vehicle aligned with the crop row.

8. A non-transitory computer-readable media, comprising:

a memory encoding processor-executable routines;

a processing system configured to access the memory and to execute the processor-executable routines, wherein the processor-executable routines, when executed by the processing system, cause the processing system to:

perform a process of recognizing trunks of fruit trees of a plantation to be worked by means of a first three-dimensional (3D) sensor system interfaced with a processor of an agricultural vehicle, wherein the agricultural vehicle is shaped to have a portal configured to move over a crop row as the agricultural vehicle moves over the crop row and the agricultural vehicle comprises a couple of rotors arranged to work simultaneously on opposite sides of each plant of the crop row, and wherein the first 3D sensor system comprises a couple of 3D sensors arranged in a lower portion of the agricultural vehicle on opposite sides of the agricultural vehicle and oriented to converge on a common point approximately on a vehicle center line axis in front of the agricultural vehicle, the process comprising the following steps of:

simultaneously acquiring two point clouds obtained from the couple of 3D sensors;

merging of the two point clouds to obtain a cumulative point cloud;

processing of the cumulative point cloud to obtain a first two-dimensional map as a horizontal slice approximately parallel with a ground; and performing a first fitting of pseudo-ellipsoids in the first two-dimensional map in order to identify the trunks of plants being worked in the crop row.

9. An agricultural vehicle, comprising:

a propulsion system;

a braking and steering system, wherein the agricultural vehicle is shaped to have a portal configured to move over a crop row as the agricultural vehicle moves over the crop row;

a couple of rotors arranged to work simultaneously on opposite sides of each plant of the crop row;

a processor; and a first three-dimensional (3D) sensor system interfaced with the processor, wherein the first 3D sensor system comprises a couple of 3D sensors arranged in a lower portion of the agricultural vehicle on opposite sides of the agricultural vehicle and oriented to converge on a common point approximately on a vehicle center line axis in front of the agricultural vehicle, wherein the processor is configured to:

simultaneously acquire two point clouds obtained from the couple of 3D sensors;

merge the two point clouds to obtain a merged point cloud;

process the merged point cloud to obtain a first two-dimensional map as a horizontal slice approximately parallel with a ground; and perform a first fitting of pseudo-ellipsoids in the first two-dimensional map in order to identify trunks of plants being worked in the crop row.

10. The agricultural vehicle according to claim 9, wherein the processor is further configured to:

trace a route based on a position of the first fitted pseudo-ellipsoids by performing a linear regression operation; and control steering of the agricultural vehicle according to the route traced.

* * * * *